(12) United States Patent
Hirai

(10) Patent No.: US 8,498,622 B2
(45) Date of Patent: Jul. 30, 2013

(54) DATA PROCESSING SYSTEM WITH SYNCHRONIZATION POLICY

(75) Inventor: Tomonori Hirai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 988 days.

(21) Appl. No.: 12/560,120

(22) Filed: Sep. 15, 2009

(65) Prior Publication Data

US 2010/0311451 A1 Dec. 9, 2010

(30) Foreign Application Priority Data

Jun. 4, 2009 (CN) .......................... 2009 1 0302916

(51) Int. Cl.
*H04M 1/725* (2006.01)
(52) U.S. Cl.
USPC ................. 455/412.1; 455/412.2; 455/185.1; 709/248; 707/610

(58) Field of Classification Search
USPC ......... 455/412.1, 412.2, 185.1, 507; 709/203, 709/248; 370/392; 707/609, 610–624
See application file for complete search history.

(56) References Cited

U.S. PATENT DOCUMENTS

| | | | |
|---|---|---|---|
| 2004/0025072 A1* | 2/2004 | Mau ............................... | 713/400 |
| 2006/0053249 A1* | 3/2006 | Yamaki et al. ................. | 711/112 |
| 2009/0177699 A1* | 7/2009 | Rosenblatt ................. | 707/104.1 |

* cited by examiner

*Primary Examiner* — Shaima Q Aminzay
(74) *Attorney, Agent, or Firm* — Altis Law Group, Inc.

(57) ABSTRACT

A data processing system includes a satellite storage device communicating with a central storage device via a network. The satellite storage device is capable of accessing the data of the central storage device and includes a storage unit capable of storing data duplicated from the central storage device. The satellite storage device is capable of selecting a synchronization policy which determines how to synchronize data between the storage unit and of the central storage device.

9 Claims, 3 Drawing Sheets

DATA PROCESSING SYSTEM WITH SYNCHRONIZATION POLICY

BACKGROUND

1. Technical Field

The present disclosure relates to data processing systems, and particularly to a data processing system with synchronization policies.

2. Description of Related Art

Thin client terminals are widely used in LANs because of their low cost. However, thin client terminals usually do not have a hard disk drive and so cannot store files, and must access files in a server terminal via a network. The efficiency of processing data in the thin client is usually limited to the bandwidth of the network.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
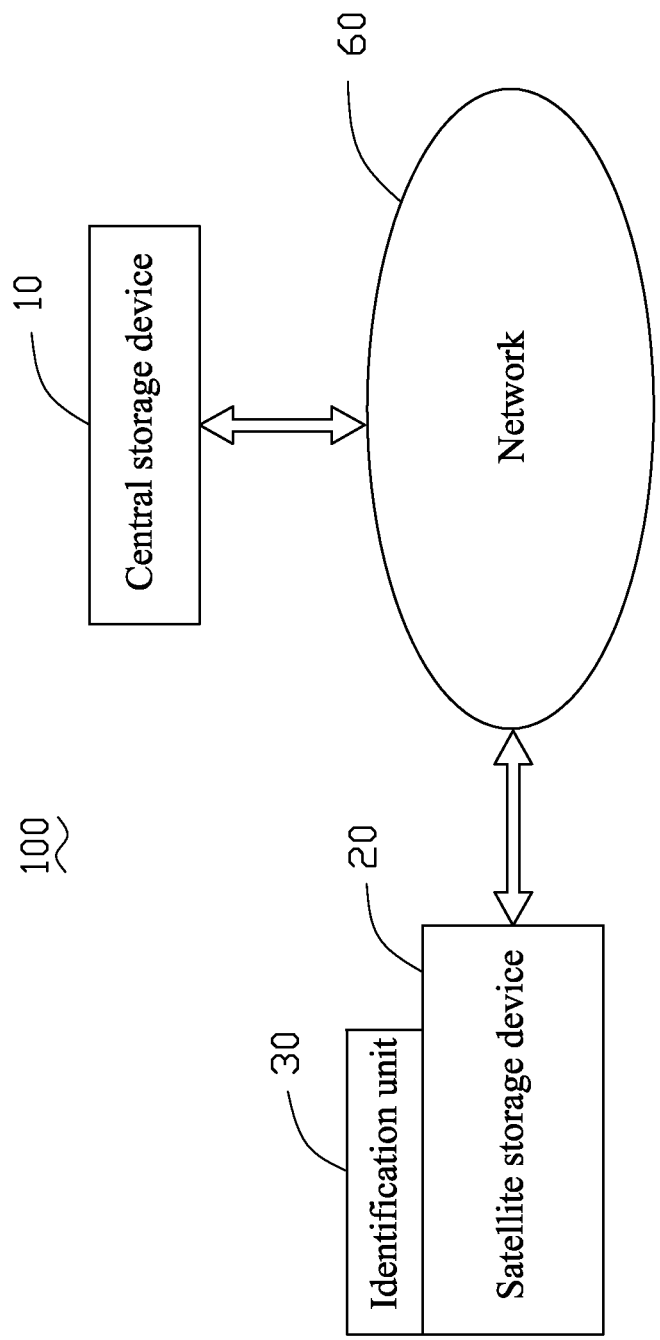
FIG. 1 is a block diagram of a data processing system in accordance with an embodiment.

Referring to FIG. 1, a data processing system in accordance with an embodiment includes a central storage device 10, a satellite storage device 20 capable of communicating with the central storage device 10 through a network 60, and an identification unit 30 capable of directly communicating with the satellite storage device 20. The central storage device 10 may be, for example, a desktop computer, a notebook computer, a server computer, etc. The network 60 may be, for example, a common network, a private network, etc.

Figure 2:
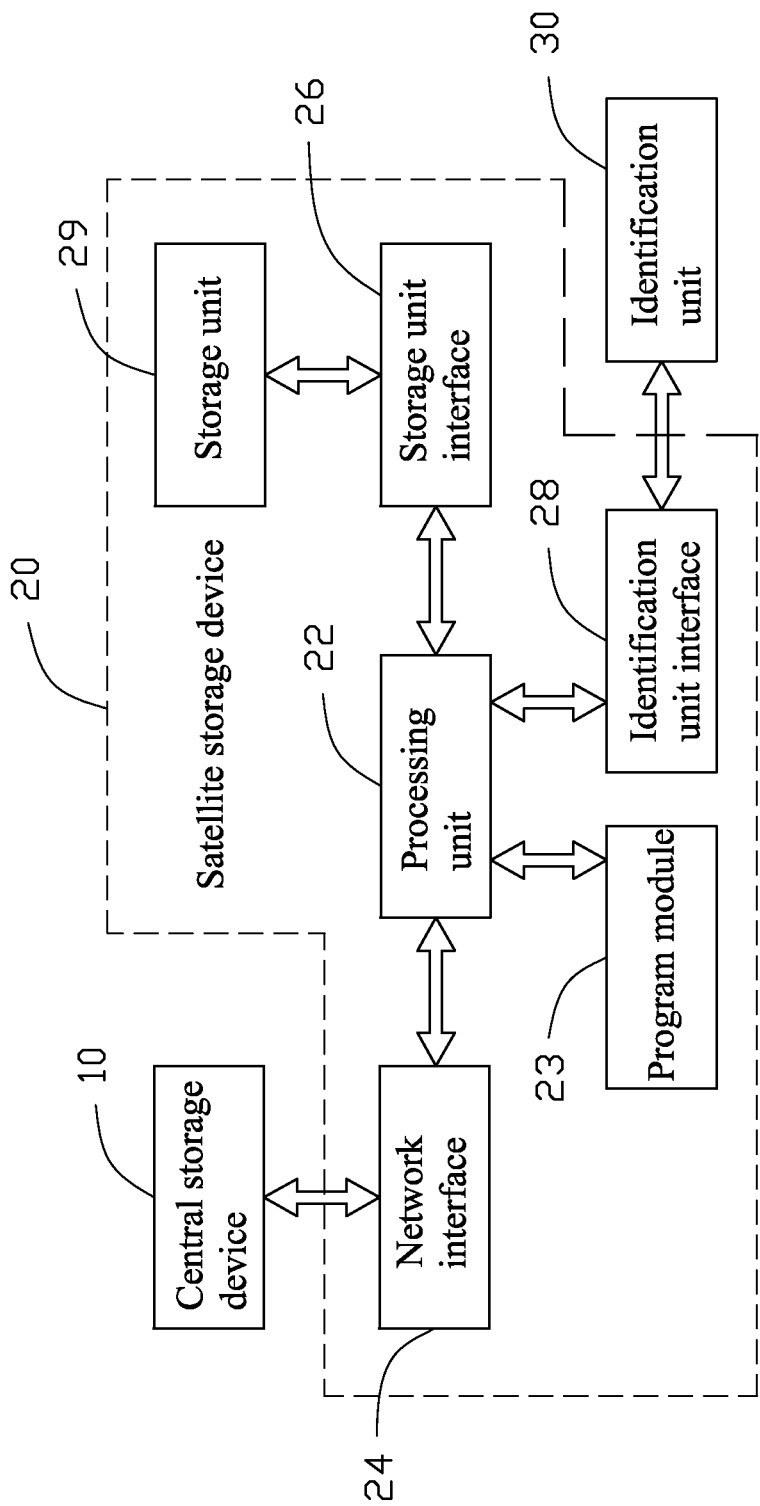
FIG. 2 is a block diagram of a data processing system of FIG. 1.

Referring also to FIG. 2, the satellite storage device 20 includes a processing unit 22, a program module 23, a network interface 24, a storage unit interface 26, an identification unit interface 28, and a storage unit 29. The processing unit 22 may be, for example, a central processing unit, a micro controller, or other element with functions for processing data, and is capable of handling events and/or input/output processing. The program module 23 is capable of managing hardware and interfaces of the satellite storage device 20, such as the network interface 24, the storage unit interface 26, the identification unit interface 28, the storage device 29, and so on. The network interface 24 is capable of allowing communication between the satellite storage device 20 and the central storage device 10 via the network 60. The storage unit interface 26 is capable of communicating with the storage unit 29. The storage unit 29 may be, for example, a hard disk drive, a solid state drive, a liquid state drive, and so on. The identification unit interface 28 is capable of communicating with the identification unit 30 and detecting the insertion or extraction event of the identification unit 30 to handle some pre-processing and post processing.

The identification unit 30 stores identification information of the central storage device 10. The identification information includes the user information authorized to access the data of the central storage device 10 and the central storage device information to which the user is authorized access. The user information includes user names and/or passwords. The central storage device information includes an internet protocol address, a network address, and so on. The satellite storage device 20 is capable of accessing the central storage device 10 with the identification information in the identification unit 30. The identification unit 30 includes a temporary storage space for temporarily storing data duplicated from the central storage device 20. The identification unit 30 may be, for example, an IC card, a magnetic card, a Universal Serial Bus device and so on.

In one embodiment, the data processing system 100 is capable of managing the synchronization data between the central storage device 10 and the satellite storage device 20 and includes synchronization types, synchronization policies, synchronization modes, and operating modes.

The synchronization types are used to determine how the user manages the synchronization data between the central storage device 10 and the satellite storage device 20 and include an entire type, a folder type, and a file type. In the entire type, the user can synchronize all data between the central storage device 10 and the satellite storage device 20. In the folder type, the user can only synchronize the data in the authorized folder between the central storage device 10 and the satellite storage device 20. In file type, the user can only synchronize the data in the authorized file between the central storage device 10 and the satellite storage device 20.

The synchronization polices are used to determine how to transfer data between the central storage device 10 and the satellite storage device 20 and include a standalone policy, a one-way policy, a bi-directional policy, and an interactive policy. In the standalone policy, the satellite storage device 20 can be used as an independent storage device. In the one-way policy, only the data of the satellite storage device 20 can be synchronized to the central storage device 10. In the bi-directional policy, the data of the central storage device 10 and the satellite storage device 20 can be synchronized to each other. In the interactive policy, the user can make decision how the contents of the central storage device 10 and the satellite storage device 20 are synchronized.

The synchronization modes are used to determine when to synchronize the data between the satellite storage device 20 and the central storage device 10 and include a real-time mode, a background mode, and a disable mode. In the real-time mode, if the data of one of the satellite storage device 20 and the central storage device is synchronized, the data of the other one would be synchronized in real time. In the background mode, the data of the satellite storage device 20 and the central storage device 10 can be synchronized in the background during idle periods on the network 60. In the disable mode, the data of the satellite storage device 20 and the central storage device 10 cannot be synchronized to each other.

The operating modes are determined by the user according to locations between the satellite storage device 20 and the central storage device 10 and include a home mode, a remote mode, and a standalone mode. In the home mode, the storage unit 29 is used as a local storage device, and the local data of the storage unit 29 will be synchronized with the data of the central storage device 10 and keep a mirror image. In the remote mode, a portion of the storage unit 29 is reserved as a temporary data area to store the data duplicated from the central storage device 10, and once some local task has been completed, then the all cashed data in the temporary data area will be discarded. In the standalone mode, the satellite storage device 20 is only used as an independent storage device.

Figure 3:
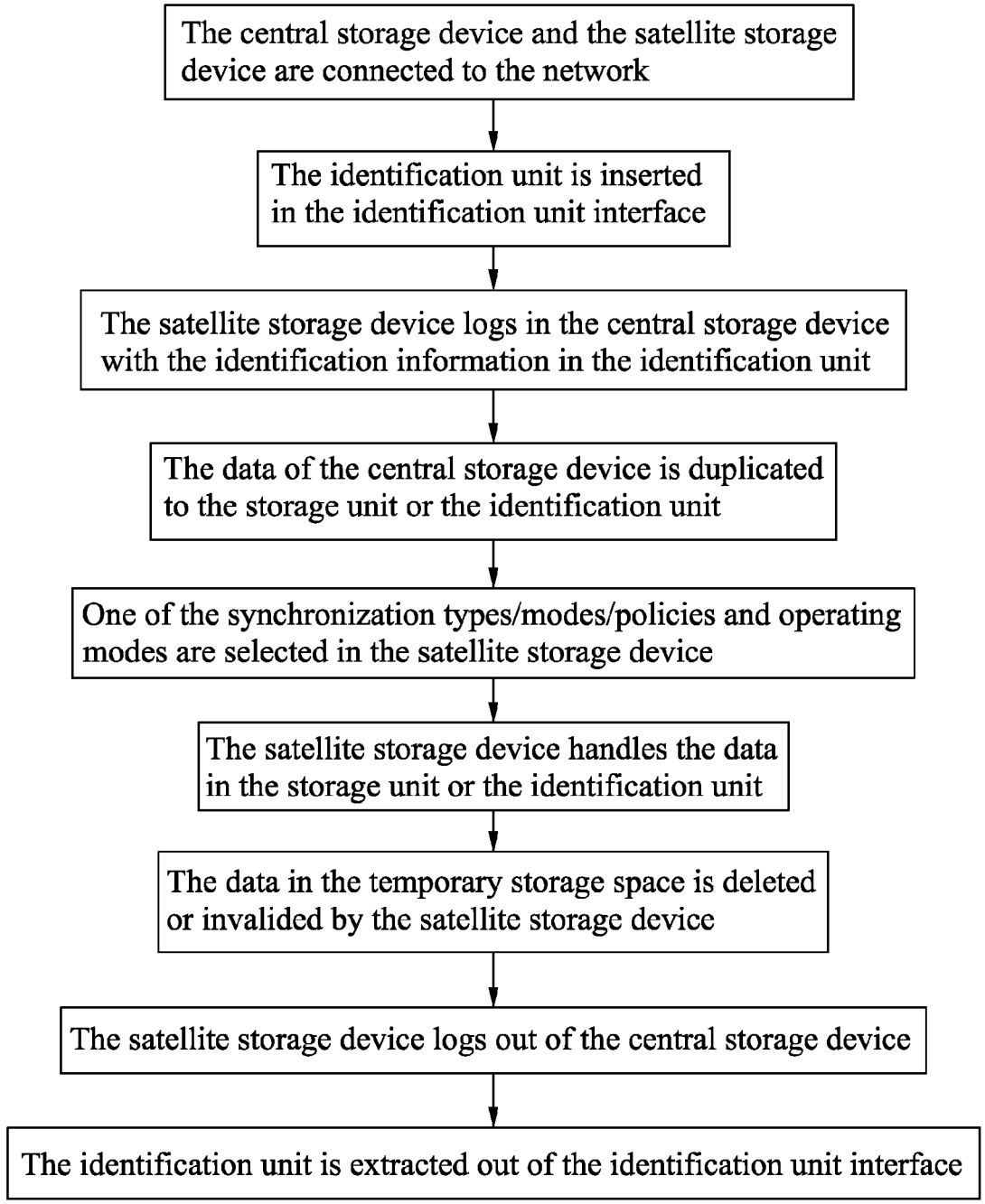
FIG. 3 is a flow chart of using the data processing system of FIG. 1.

Referring also to FIG. 3, in use, the central storage device 10 and the satellite storage device 20 communicate with each other via the network 60. The identification unit 30 is plugged into the identification unit interface 28. The satellite storage device 20 detects the insertion event of the identification unit 30, gets identification information of the identification unit 30, and logs in the central storage device 10. At this time, the user can access the data of the central storage device 10 via the satellite storage device 20. If the data needs to be processed, including, but not limited to, editing, revising, replacing, the data can be copied to the storage unit 29 or the identification unit 30. The user can select the synchronization type, synchronization policy, synchronization mode, and operating mode. Based on the synchronization type, synchronization policy, synchronization mode, and operating mode, the data can be synchronized between the central storage device 10 and the satellite storage device 20. Before the identification unit 30 is wanted to remove, and the satellite storage device 20 will do the post processing, such as cleaning or invalidating the local cached data. The user then logs out of the satellite storage device 20.

In addition, if the user is at home, the home mode can be established. In the home mode, the satellite storage device 20 can copy the data from the central storage device 10. Because the data is stored in the satellite storage device 20, the satellite storage device 20 accesses the data locally faster than accessing the data in the central storage device 10. If the user is out of the home, the remote mode can be established. In the remote mode, the data is copied from the central storage device 20 to a temporary area of the satellite storage device 20. After the task has been completed, the data will be discarded. Because the speed of accessing the local storage unit 29 or the identification unit 30 of the satellite storage device 20 is faster than accessing the central storage device 10, the data processing efficiency can be improved.

It is to be understood, however, that even though numerous characteristics and advantages have been set forth in the foregoing description of embodiments, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A data processing system comprising:
a satellite storage device capable of communicating with a central storage device via a network; wherein the satellite storage device is capable of accessing data on the central storage device and comprises: a storage unit capable of storing data duplicated from the central storage device; the satellite storage device is capable of selecting a synchronization policy which determines how to synchronize data from the storage unit to the central storage device;
wherein the data duplicated from the central storage device is capable of being edited in the storage unit by a user, the edited data is stored in the storage unit, and the satellite storage device is capable of selecting the synchronization policy which determines how to synchronize the edited data from the storage unit to the central storage device.

2. A data processing system comprising:
a satellite storage device capable of communicating with a central storage device via a network, the satellite storage device comprising: a storage unit capable of storing data duplicated from the central storage device; the data is capable of being edited in the storage unit by a user; and
a managing means capable of determining how to synchronize the edited data from the storage unit to the central storage device.

3. The data processing system of claim 2, wherein the managing means comprises a standalone policy, in which the satellite storage device is used as an independent storage device.

4. The data processing system of claim 2, wherein the managing means comprises a one-way policy, in which the data can be synchronized only from the storage unit to the central storage device.

5. The data processing system of claim 2, wherein the managing means comprises a bi-direction policy, in which the data can be synchronized between the storage unit and the central storage device.

6. The data processing system of claim 2, wherein the managing means comprises an interactive policy, in which the data to be synchronize between the central storage device and the satellite storage device is determined by a user.

7. The data processing system of claim 2, wherein the storage unit comprises a temporary storage space capable of temporarily storing the data duplicated from the central storage device.

8. The data processing system of claim 2, further comprising an identification unit capable of communicating with the satellite storage device, the identification unit is capable of storing identification information with which the satellite storage device can access the central storage device.

9. The data processing system of claim 8, wherein the identification unit comprises a temporary storage space capable of temporarily storing data duplicated from the central storage device.

* * * * *